(12) United States Patent
Henning et al.

(10) Patent No.: US 8,557,944 B2
(45) Date of Patent: Oct. 15, 2013

(54) POLYSILOXANES WITH NITROGEN-CONTAINING GROUPS

(75) Inventors: Frauke Henning, Essen (DE); Michael Ferenz, Essen (DE); Wilfried Knott, Essen (DE); Stefan Silber, Krefeld (DE); Hans Henning Wenk, Mülheim an der Ruhr (DE); Dirk Kuppert, Aschaffenburg (DE); Frank Koenig, Gelsenkirchen (DE)

(73) Assignee: Evonik Goldschmidt GmbH, Essen (DE)

( * ) Notice: Subject to any disclaimer, the term of this patent is extended or adjusted under 35 U.S.C. 154(b) by 0 days.

(21) Appl. No.: 13/279,676

(22) Filed: Oct. 24, 2011

(65) Prior Publication Data
US 2012/0097883 A1  Apr. 26, 2012

(30) Foreign Application Priority Data

Oct. 25, 2010 (DE) .......... 10 2010 042 861
Nov. 30, 2010 (DE) .......... 10 2010 062 156

(51) Int. Cl.
*C08G 77/26* (2006.01)

(52) U.S. Cl.
USPC ............... 528/38; 528/26; 528/28; 528/34; 556/424

(58) Field of Classification Search
None
See application file for complete search history.

(56) References Cited

U.S. PATENT DOCUMENTS

| | | | |
|---|---|---|---|
| 5,371,161 A | 12/1994 | Knott et al. | |
| 5,401,871 A | 3/1995 | Feldmann-Krane et al. | |
| 5,430,166 A | 7/1995 | Klein et al. | |
| 5,430,167 A | 7/1995 | Klein et al. | |
| 5,455,367 A | 10/1995 | Klein et al. | |
| 5,475,127 A | 12/1995 | Klein et al. | |
| 5,613,988 A | 3/1997 | Spiegler et al. | |
| 5,741,876 A * | 4/1998 | Carpenter et al. | 528/10 |
| 5,804,099 A | 9/1998 | Heilen et al. | |
| 5,863,966 A | 1/1999 | Ebbrecht et al. | |
| 5,977,282 A | 11/1999 | Ebbrecht et al. | |
| 5,981,812 A | 11/1999 | Eufinger et al. | |
| 6,054,534 A | 4/2000 | Josten et al. | |
| 6,194,596 B1 | 2/2001 | Josten et al. | |
| 6,207,781 B1 | 3/2001 | Halloran et al. | |
| 6,255,429 B1 | 7/2001 | Griffin et al. | |
| 6,255,511 B1 | 7/2001 | Klein et al. | |
| 6,288,129 B1 | 9/2001 | Gruning et al. | |
| 6,291,622 B1 | 9/2001 | Drose et al. | |
| 6,297,331 B1 | 10/2001 | Feldmann-Krane et al. | |
| 6,307,082 B1 | 10/2001 | Klein et al. | |
| 6,391,831 B1 | 5/2002 | Ebbrecht et al. | |
| 6,420,324 B1 | 7/2002 | Ebbrecht et al. | |
| 6,423,785 B1 | 7/2002 | Esselborn et al. | |
| 6,433,028 B1 | 8/2002 | Ebbrecht et al. | |
| 6,451,863 B1 | 9/2002 | Ebbrecht et al. | |
| 6,489,498 B2 | 12/2002 | Klein et al. | |
| 6,521,771 B2 | 2/2003 | Frommeyer et al. | |
| 6,525,103 B2 | 2/2003 | Ebbrecht et al. | |
| 6,552,091 B1 | 4/2003 | Boinowitz et al. | |
| 6,552,092 B2 | 4/2003 | Ebbrecht et al. | |
| 6,686,320 B2 | 2/2004 | Ebbrecht et al. | |
| 6,835,420 B1 | 12/2004 | Röckrath et al. | |
| 6,858,663 B2 | 2/2005 | Knott et al. | |
| 6,861,493 B2 | 3/2005 | Bauer et al. | |
| 6,958,410 B2 * | 10/2005 | Koch et al. | 556/419 |
| 7,018,458 B2 | 3/2006 | Knott et al. | |
| 7,118,619 B2 | 10/2006 | Brandt et al. | |
| 7,125,585 B2 | 10/2006 | Dudzik et al. | |
| 7,157,541 B2 | 1/2007 | Knott et al. | |
| 7,189,772 B2 | 3/2007 | Bauer et al. | |
| 7,196,153 B2 | 3/2007 | Burkhart et al. | |
| 7,361,777 B2 | 4/2008 | Herrwerth et al. | |
| 7,393,396 B2 | 7/2008 | Lehmann et al. | |
| 7,399,348 B2 | 7/2008 | Blanda et al. | |
| 7,442,724 B2 | 10/2008 | Esselborn et al. | |
| 7,598,334 B2 | 10/2009 | Ferenz et al. | |
| 7,605,284 B2 | 10/2009 | Brueckner et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,635,581 B2 | 12/2009 | Ferenz et al. | |
| 7,645,848 B2 | 1/2010 | Knott et al. | |
| 7,727,599 B2 | 6/2010 | Doehler et al. | |
| 7,754,778 B2 | 7/2010 | Knott et al. | |
| 7,776,989 B2 | 8/2010 | Ferenz et al. | |
| 7,825,205 B2 | 11/2010 | Knott et al. | |
| 7,825,206 B2 | 11/2010 | Neumann et al. | |
| 7,825,207 B2 | 11/2010 | Ferenz et al. | |
| 7,825,209 B2 | 11/2010 | Knott et al. | |
| 7,834,122 B2 | 11/2010 | Ferenz et al. | |
| 7,847,123 B2 | 12/2010 | Wenk et al. | |
| 7,855,265 B2 | 12/2010 | Thum et al. | |
| 7,893,128 B2 | 2/2011 | Busch et al. | |
| 7,931,747 B2 | 4/2011 | Weyershausen et al. | |

(Continued)

FOREIGN PATENT DOCUMENTS

| | | |
|---|---|---|
| DE | 10214139 | 3/2002 |
| EP | 0515915 | 5/1992 |
| EP | 0342830 | 1/1995 |
| EP | 0856553 | 8/1998 |
| EP | 0915119 | 5/1999 |
| EP | 1035152 | 9/2000 |
| EP | 1792609 | 6/2007 |
| EP | 1988116 | 11/2008 |
| JP | 2002-167437 | 6/2002 |
| JP | 2006-182949 | 7/2006 |
| JP | 2006/213856 | * 8/2006 |
| WO | WO 2006/013146 | 2/2006 |
| WO | WO 2006/081927 | 8/2006 |
| WO | WO 2006/098408 | 9/2006 |

OTHER PUBLICATIONS

Machine translation of JP 2006-213856 into English.*
European Search Report for EP 11182859 dated Jun. 5, 2012.

*Primary Examiner* — Marc Zimmer
(74) *Attorney, Agent, or Firm* — Frommer Lawrence & Haug LLP

(57) ABSTRACT

Endblocked polysiloxanes with lateral amino functions and at least one further lateral and/or terminal functional group.

11 Claims, No Drawings

(56) References Cited

U.S. PATENT DOCUMENTS

| | | |
|---|---|---|
| 7,964,694 B2 | 6/2011 | Ferenz et al. |
| 2002/0161158 A1 | 10/2002 | Burkhart et al. |
| 2004/0024089 A1 | 2/2004 | Busch et al. |
| 2004/0063818 A1 | 4/2004 | Silber et al. |
| 2004/0186308 A1 | 9/2004 | Koch et al. |
| 2006/0155090 A1 | 7/2006 | Ferenz et al. |
| 2007/0059539 A1 | 3/2007 | Doehler et al. |
| 2007/0128143 A1 | 6/2007 | Gruning et al. |
| 2007/0197678 A1 | 8/2007 | Cavaleiro et al. |
| 2007/0213226 A1 | 9/2007 | Sieverding et al. |
| 2008/0034794 A1 | 2/2008 | Ebbrecht et al. |
| 2008/0076842 A1 | 3/2008 | Ferenz et al. |
| 2008/0108709 A1 | 5/2008 | Meyer et al. |
| 2008/0125503 A1 | 5/2008 | Henning et al. |
| 2008/0187702 A1 | 8/2008 | Ferenz et al. |
| 2008/0216708 A1 | 9/2008 | Herrwerth et al. |
| 2008/0251751 A1 | 10/2008 | Brückner et al. |
| 2009/0054521 A1 | 2/2009 | Herrwerth et al. |
| 2009/0087399 A1 | 4/2009 | Kuppert et al. |
| 2009/0104294 A1 | 4/2009 | Wenk et al. |
| 2009/0137751 A1 | 5/2009 | Knott et al. |
| 2009/0137752 A1 | 5/2009 | Knott et al. |
| 2010/0022435 A1 | 1/2010 | Henning et al. |
| 2010/0029587 A1 | 2/2010 | Brückner et al. |
| 2010/0031852 A1 | 2/2010 | Herrwerth et al. |
| 2010/0034765 A1 | 2/2010 | Herrwerth et al. |
| 2010/0036011 A1 | 2/2010 | De Gans et al. |
| 2010/0041910 A1 | 2/2010 | Schubert et al. |
| 2010/0055760 A1 | 3/2010 | Thum et al. |
| 2010/0056649 A1 | 3/2010 | Henning et al. |
| 2010/0056818 A1 | 3/2010 | Ferenz et al. |
| 2010/0071849 A1 | 3/2010 | Knott et al. |
| 2010/0081763 A1 | 4/2010 | Meyer et al. |
| 2010/0081781 A1 | 4/2010 | Schubert et al. |
| 2010/0105843 A1 | 4/2010 | Knott et al. |
| 2010/0113633 A1 | 5/2010 | Henning et al. |
| 2010/0168367 A1 | 7/2010 | Schubert et al. |
| 2010/0184913 A1 | 7/2010 | Ebbrecht et al. |
| 2010/0210445 A1 | 8/2010 | von Rymon Lipinski et al. |
| 2010/0248325 A1 | 9/2010 | Eckstein et al. |
| 2010/0249339 A1 | 9/2010 | Henning et al. |
| 2010/0266651 A1 | 10/2010 | Czech et al. |
| 2010/0292357 A1 | 11/2010 | Knott et al. |
| 2010/0298455 A1 | 11/2010 | Henning et al. |
| 2011/0021693 A1 | 1/2011 | Henning et al. |
| 2011/0034576 A1 | 2/2011 | Henning et al. |
| 2011/0042004 A1 | 2/2011 | Schubert et al. |
| 2011/0046305 A1 | 2/2011 | Schubert et al. |
| 2011/0144269 A1 | 6/2011 | Kuppert et al. |

\* cited by examiner

POLYSILOXANES WITH NITROGEN-CONTAINING GROUPS

INCORPORATION BY REFERENCE

This application claims benefit under 35 U.S.C. 119(a) of German patent application DE 10 2010 062156.0, filed on 30 Nov. 2010 and DE 10 2010 042861.2, filed on 25 Oct. 2010.

Any foregoing applications [including German patent applications DE 10 2010 062156.0 and 10 2010 042861.2, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

FIELD OF INVENTION

The present invention relates to polysiloxanes modified with lateral amino functions and at least one further lateral functional group in defined ratios, the process for preparing these multifunctional polysiloxanes, preparations comprising such multifunctional polysiloxanes and the use of these multifunctional polysiloxanes or of their preparations.

BACKGROUND

Amino-functional siloxanes are widely used as constituents of textile-reconditioning compositions, more particularly of textile-softening compositions, as constituents of laundry detergent or cleaning compositions for textiles and hydrophobicizing agents. A multiplicity of structural variations of this group of compounds are described in the prior art and are obtainable via different routes. However, terminally amino-modified, purely linear polydimethylsiloxanes cannot be varied in their degree of modification in the course of preparation. This is disadvantageous because not only the number of the amino groups but also their type has considerable influence on the aminopolysiloxane's substantivity, i.e. the ability to bind to carriers such as keratinic substances for example, or else to textiles. The total nitrogen content of an aminosiloxane is an important parameter because it correlates directly with the substantivity of the aminosiloxane.

ABn multiblock copolymers are described for extending the polymer chain without reducing the number of amino functionalities. However, as chain length increases, linear copolymers become very viscous and hence difficult to handle. U.S. Pat. No. 5,807,956 and U.S. Pat. No. 5,981,681 teach non-hydrolyzable block copolymers of the $(AB)_nA$ type with alternating units consisting of polysiloxane and amino-polyalkyleneoxide. They are prepared by linking α,Ω-dihydrogenpolydimethylsiloxanes to epoxy-bearing olefins in SiC fashion by nobel metal-catalyzed hydrosilation and reacting the resulting epoxy-terminated siloxanes with amino-terminated polyalkylene oxides. Alternatively, α,Ω-dihydrogenpolydimethyl-siloxanes are linked to epoxy-terminated allyl polyethers by hydrosilation and the epoxy-functionalized siloxanes thus obtained are subsequently reacted with diamines.

Polysiloxanes having high degrees of modification combined with a chain length which can be varied irrespective of the nitrogen content are obtainable by lateral functionalization of a polysiloxane with amino-containing organic substituents.

The prior art discloses a multiplicity of references dealing with laterally modified aminosiloxanes. Laterally modified aminosiloxanes are obtainable under base catalysis or under acid catalysis. Preparation by base-catalyzed equilibration, as described in paragraphs [0154] and [0155] in EP 1 972 330 (U.S. Patent Appl. Pub. 2011-104085) for example, can lead, depending on the starting materials used, either to terminally dihydroxy-functional, laterally amino-modified polysiloxanes, or to laterally amino-modified polysiloxanes endblocked with trimethylsilyl groups. Such endblocked polysiloxanes, when compared with their structural analogues having free SiOH groups, not only have superior storage stability in the absence of a solvent, but also prevent gellike precipitations and accretions in the handling of aqueous emulsions of such polysiloxanes. These gel deposits are particularly unwelcome for applications in the textile sector.

An acid-catalyzed condensation polymerization according to the prior art, as represented in U.S. Pat. No. 7,238,768 B2 for example, leads to amino-modified polysiloxanes having hydroxyl groups or alkoxy groups at their chain ends. True, the process has lower reaction temperatures and shorter reaction times and hence is advantageous compared with base-catalyzed equilibrations, but this more economical manufacturing process is responsible for the reduced hydrolytic stability of these non-endblocked siloxanes due to the absent trimethylsilyl end groups.

Amino-functional polysiloxanes are undergoing constant improvement in order that the textile fabrics treated therewith may be endowed with advantageous effects, for example a textile-softening effect and crease resistance, and/or to reduce the harmful or negative effects which can arise in the course of cleaning and/or conditioning and/or wearing, for example fading, greying, etc. In addition, sufficient hydrophilicity shall be achieved for the fabric as well as good softness. It is a further disadvantage of textile-softening formulations based on polysiloxanes of the prior art that the softening property of a fabric finished therewith may in the worst case be lost after just a single wash. There is accordingly a need for textile-softening polysiloxanes having enhanced durability on textiles both in the OEM finishing of textile manufacture and in cleaning and reconditioning, for example in the rinse cycle softening of a washing machine.

This increases the need for the production process to provide structurally precisely defined polymers whose nitrogen content, type and quantity of amino groups and whose chain length can be independently varied via the recipe. At the same time, however, the production process shall safeguard the consistent composition and reproducible quality for the amino-containing polymers with regard to the particular application.

U.S. Pat. No. 6,171,515 B1 describes endblocked and also dialkoxy-functional aminopolysiloxanes which, in a synthesis step subsequent to the siloxane polymerization, undergo a functionalization of the primary and secondary amino groups with epoxy-functional monomers such as glycidol for example. A similar functionalization of aminosiloxanes with alkylene oxides is described in EP0399706. Further functionalizations of amino-functional polysiloxanes with glycerol carbonate or gluconolactone are described in EP 1 972 330 and in J. Phys. Chem. B 2010, 114, 6872-6877.

For enhanced substantivity, JP 2002-167437-A describes laterally guanidino-functionalized polysiloxanes prepared by reacting the corresponding aminopolysiloxanes with cyanamide. WO 2006/081927 describes the condensation copolymerization of a dihydroxy-functional polydimethylsiloxane with a guanidino-containing silane and an amino-containing silane. Although a functionalization of the polysiloxane with nitrogen-containing groups that differ in type and quantity is possible in this way, WO 2006/081927 (U.S. Pat. No. 7,825,207) does not disclose any route to endblocked multiaminofunctional polysiloxanes.

SUMMARY OF INVENTION

The problem addressed by the present invention is that of providing alternative functionalized aminopolysiloxanes having enhanced durability and/or substantivity on textiles both in the OEM finishing of textile manufacture and in cleaning and reconditioning, for example in the rinse cycle softening of a washing machine.

The problem is surprisingly solved by novel endblocked polysiloxanes modified with lateral amino functions and at least one further lateral and/or terminal functional group in defined ratios.

The present invention accordingly provides endblocked polysiloxanes modified with lateral amino functions and at least one further lateral and/or terminal functional group in defined ratios, and their method of making.

The present invention provides polysiloxanes of formula 1

  (formula 1)

$M = [R^2R^1{}_2SiO_{1/2}]$ $D = [R^1{}_2SiO_{2/2}]$ $D^A = [R^1Si(R^7NHR^3)O_{2/2}]$ $D^B = [R^1SiR^4O_{2/2}]$ $D^C = [R^1SiR^5O_{2/2}]$ $T = [R^1SiO_{3/2}]$ $Q = [SiO_{4/2}]$ where $R^1$ in each occurrence independently represents identical or different linear or branched, saturated or unsaturated hydrocarbon radicals having 1 to 30 carbon atoms or else aromatic hydrocarbon radicals having 6 to 30 carbon atoms preferably methyl or phenyl, more particularly methyl;

$R^2$ in each occurrence independently represents $R^1$, an alkoxy radical or a hydroxyl group, preferably $R^1$ and more particularly methyl;

$R^3$ in each occurrence independently represents hydrogen or a hydrocarbon radical substituted with nitrogen atoms, for example an aminoethyl radical, more particularly hydrogen;

$R^4$ in each occurrence independently represents identical or different linear or branched, saturated or olefinically unsaturated hydrocarbon radicals having 8 to 30 carbon atoms, for example decyl, dodecyl, tetradecyl, hexadecyl, octadecyl, more particularly hexadecyl and octadecyl;

$R^5$ in each occurrence independently represents identical or different linear or branched, saturated or unsaturated polar hydroxyl-substituted amide radicals having 1 to 30 carbon atoms and/or hydroxyl-substituted carbamate radicals having 1 to 30 carbon atoms and/or ethoxylated amine radicals having 1 to 30 carbon atoms and/or guanidine radicals or alkylenylguanidine radicals having 1 to 30 carbon atoms, preferably selected from the group of substituents of formula 1a to 1h

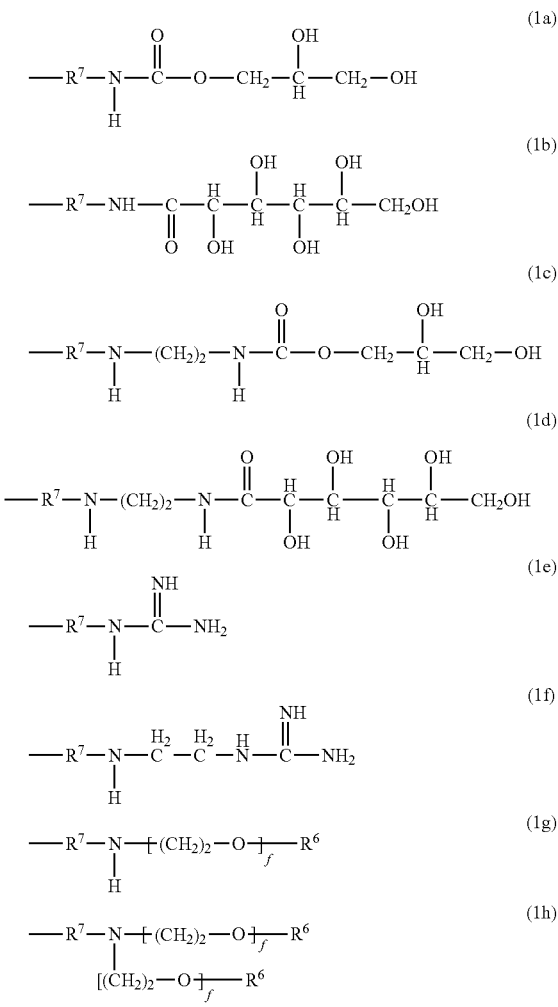

$R^6$ represents hydrogen, a hydrocarbon radical, an acyl radical, a carboxylate radical or a carbamate or carbonate radical, more particularly hydrogen and $CH_3$—C(O);

$R^7$ in each occurrence independently represents identical or different linear or branched, saturated or unsaturated, divalent hydrocarbon groups having 1 to 20 and preferably 1 to 6 carbon atoms and more particularly a —$(CH_2)_3$— group, a=2 to 20; preferably 2 to 10, in particular 2;

b=10 to 5000, preferably 20 to 2000, in particular 20-1000;

c=1 to 500, preferably 1 to 100, in particular 1 to 30;

d=0 to 500, preferably 0 to 100, in particular 0 to 30;

e=0 to 500, preferably 1 to 100, in particular 1 to 30;

f=0 to 20, preferably 0 to 10, in particular 0;

g=0 to 20, preferably 0 to 10, in particular 0;

or their ionic adducts with protic reactants $H^+A^-$, with the proviso that at least 50% and preferably at least 70% of the $R^2$ radicals are =$R^1$ and that at least one of the indices d and e shall be ≠0 and that in the case of d=0 e shall be ≠0 and in the case of e=0 d shall be ≠0; and that preferably c, e>0 and c>0.5*e and more particularly c, e>0 and c≥e.

In a preferred embodiment of the polysiloxanes according to the invention, $R^5$ in formula 1 is at least one substituent selected from the formulae 1a to 1f, with the proviso that the index c in formula 1 is greater than the index e.

The various monomer units of the siloxane chains indicated in the formulae can be arranged in blocks with any number of blocks and any sequence, or have a statistical distribution. The indices used in the formulae shall be regarded as statistical means. All references to % by weight related to the total weight of the composition.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

The invention further provides the ionic adducts of the inventive polysiloxanes having nitrogen-containing groups with acids of the general formula $H^+A^-$. The anions $A^-$ are identical or different counter-ions to the positive charges, selected from organic or inorganic anions of the acids $M^+A^-$, and also derivatives thereof. Preferred anions are for example chloride, sulphate or hydrogensulphates, carbonate or hydrogencarbonate, phosphate or hydrogenphosphates, acetate or homologous carboxylates having linear or branched, saturated or olefinically unsaturated alkyl chains, aromatic carboxylates, amino acid carboxylates, citrates, malonates, fumarates, maleates, substituted and unsubstituted succinates and L-hydroxy carboxylates, such as lactate for example. The aminosiloxanes according to the invention and their ionic adducts can be present in dissociation equilibria, depending on the stability of the adduct formed.

The present invention further provides compositions and preparations and also the use of these multifunctional polysiloxanes, which ensure simple formulation in textile conditioners for OEM finishing and in textile re-conditioning compositions for reconditioning repeated cleaning and good application properties thereof on textiles and fabrics.

The invention further provides compositions comprising the multifunctional siloxanes according to the invention and further formulation and processing auxiliaries such as for example aliphatic and aromatic, protic and aprotic solvents, cosurfactants, betaines, emulsifiers, fatty alcohol alkoxylates, mono-, di- and triglycerides, oils of synthetic and natural origin.

By textile-conditioning composition is meant in this context any composition used in the finishing of the manufactured textile before sale to the consumer.

By textile-reconditioning composition is meant in this context any composition which endows textile fabrics treated therewith an advantageous effect, for example a textile-softening effect and crease resistance, and/or reduces the harmful or negative effects which can arise in the course of cleaning and/or conditioning and/or wearing, for example fading, greying, etc. It is particularly preferable for the textile-reconditioning composition to be a textile-softening composition (rinse cycle softener). The invention further provides laundry detergent or cleaner compositions comprising the multifunctional polysiloxanes.

The invention also provides a process wherein different functional silanes can be reacted in a condensation process with terminally hydroxyl-functional polydimethylsiloxanes to form multifunctional endblocked polysiloxanes. In a first step of the process according to the invention, aminoalkyldialkoxysilanes can be further functionalized at the amino group and cocondensed, in a second step, in specific ratios relative to each other, with hydroxyl-functional polydimethylsiloxanes in the presence of reagents releasing trimethylsilyl groups. It is unexpected and surprising to a person skilled in the art that trimethylsilyl groups endblock the silicone chain selectively without silating the amino groups or hydroxyl groups of the lateral organic modifications, as described in WO 99/17615 for example.

The invention further provides for the use of the multifunctional siloxanes according to the invention in textile-conditioning and textile-reconditioning compositions, more particularly textile-softening compositions (rinse cycle softeners). Commercially available rinse cycle softeners are aqueous formulations which include as their main active constituent one or more cationic textile-softening compounds having one or more long-chain alkyl groups in a molecule. Widely used cationic textile-softening compounds include for example methyl-N-(2-hydroxyethyl)-N,N-di(tallowacyloxyethyl)ammonium compounds or N,N-dimethyl-N,N-di (tallowacyloxyethyl)-ammonium compounds. Further suitable ammonium compounds are disclosed by US 2010/0184634 in paragraphs [0027] to [0068], the explicit disclosure content of which in this regard is hereby incorporated herein by reference. The rinse cycle softeners may further comprise additives and assistants, more particularly perfume, dyes, viscosity regulators, defoamers, preservatives, organic solvents, non-siloxane polymers and other siloxane polymers not according to the invention. More particularly, the compositions according to the invention may comprise between 0.001% and 25% and more preferably from 0.01% to 15% by weight of one or more different additives or assistants.

As scent, any scent or scent mixture known to be suitable for aqueous rinse cycle softeners from the prior art can be used, preferably in the form of a perfume oil. Examples of scent and/or fragrance chemicals are disclosed inter alia in DE 197 51 151 A1 page 4 lines 11-17. More particularly, the compositions according to the invention may comprise between 0.01% and 10% and more preferably from 0.1% to 5% by weight of one or more scents or scent mixtures.

Any dye known to be suitable for aqueous rinse cycle softeners from the prior art can be used, in which case water-soluble dyes are preferred. Examples of suitable water-soluble commercially available dyes are SANDOLAN® Walkblau NBL 150 milling blue (from Clariant) and Sicovit® Azorubin 85 E122 azo ruby (from BASF). More particularly, the compositions according to the invention may comprise between 0.001% and 0.1% by weight and more preferably from 0.002% to 0.05% by weight of one or more dyes or dye mixtures.

By way of a viscosity regulator to reduce the viscosity, the aqueous rinse cycle softener may comprise an alkali or alkaline earth metal salt, preferably calcium chloride, in an amount of 0.05-2% by weight.

By way of a viscosity regulator to increase the viscosity, the aqueous rinse cycle softener may comprise a thickener known to be suitable from the prior art, in which case the polyurethane thickeners known from WO 2007/125005 (U.S. Patent Application Publication 2009-124533) are preferred. Examples of suitable thickeners are TEGO® Visco Plus 3030 (from Evonik Tego Chemie), Acusol® 880 and 882 (from Rohm & Haas), Rheovis® CDE (from BASF), Rohagit® KF 720 F (from Evonik Röhm GmbH) and Polygel® K100 from Neochem GmbH.

Any defoamer known to be suitable for aqueous rinse cycle softeners from the prior art can be used. Examples of suitable commercially available softeners are Dow Corning® DB-110A and TEGO® Antifoam® 7001 XP. More particularly, the compositions according to the invention may comprise between 0.0001% and 0.05% and more preferably from 0.001% and 0.01% by weight of one or more different defoamers.

By way of preservatives, the aqueous rinse cycle softener may comprise bactericidal and/or fungicidal actives known to be suitable from the prior art, in which case water-soluble actives are preferred. Examples of suitable commercially available bactericides are methylparaben, 2-bromo-2-nitro-1,3-propanediol, 2-methyl-4-isothiazolin-3-one and 5-chloro-2-methyl-4-isothiazolin-3-one. The aqueous rinse cycle softener may equally comprise an oxidation inhibitor by way of a preservative. Examples of suitable commercially available oxidation inhibitors are ascorbic acid, 2,6-di-tert-butyl-4-methylphenol (BHT), butylhydroxyanisole (BHA), tocopherol and propyl gallate. More particularly, the compositions according to the invention may comprise between 0.0001% and 0.5% and more preferably from 0.001% to 0.2% by weight of one or more different preservatives. More particularly, the compositions according to the invention may comprise between 0.001% and 0.01% and more preferably from 0.001% to 0.01% by weight of one or more different oxidation inhibitors.

By way of organic solvents, the rinse cycle softener may comprise short-chain alcohols, glycols and glycol monoethers, in which case ethanol, 2-propanol, 1,2-propanediol and dipropylene glycol is preferred. More particularly, the compositions according to the invention may comprise between 0.1% and 10% and more preferably from 0.2% to 5% by weight of one or more different organic solvents.

The rinse cycle softener may comprise one or more non-siloxane polymers. Examples thereof are carboxymethyl-cellulose, polyethylene glycol, polyvinyl alcohol, poly(meth)acrylates, polyethyleneimines or polysaccharides. More particularly, the compositions according to the invention may comprise between 0.01% and 25% and more preferably from 0.1% to 10% by weight of one or more different non-siloxane polymers.

The invention further provides for the use of the multifunctional siloxanes according to the invention in laundry detergents or cleaner. Incorporation into a laundry detergent or cleaner compositions provides the consumers with a textile-reconditioning laundry detergent or cleaner ("2in1" laundry detergent or cleaner), and they no longer need to dose two products (laundry detergent or cleaner product one the one hand and rinse cycle softener on the other) as well as no separate rinse cycle. In addition to the textile-reconditioning composition and the surfactants, the laundry detergent or cleaner compositions can comprise further ingredients to further improve the performance and/or aesthetic characteristics of the laundry detergent or cleaner composition. Preferred laundry detergent or cleaner compositions further comprise one or more from the group of surfactants, builders, bleaches, bleach activators, enzymes, perfumes, perfume carriers, fluorescers, dyes, foam inhibitors, silicone oils, antiredeposition agents, optical brighteners, greyness inhibitors, shrinkage inhibitors, crease resistant agents, dye transfer inhibitors, antimicrobial actives, germicides, fungicides, antioxidants, preservatives, corrosion inhibitors, antistats, bittering agents, ironing aids, phobing and impregnating agents, swelling and non-slip agents, neutral filling salts and also UV absorbers. More particularly, the compositions of the invention may comprise between 0.001% and 90% and more preferably from 0.01% to 45% by weight of one or more of the further ingredients mentioned here.

Examples of usable surfactants are described in WO 2007/115872 (U.S. Patent Application Publication 2009-042766) page 17 line 28 to page 21 line 24. Examples of builders, bleaches, bleach activators, bleach catalysts and enzymes are described in WO 2007/115872 page 22 line 7 to page 25 line 26. Antiredeposition agents, optical brighteners, greyness inhibitors, dye transfer inhibitors are described by way of example in WO 2007/115872 at page 26 line 15 to page 28 line 2. Examples of crease resist agents, antimicrobial actives, germicides, fungicides, antioxidants, preservatives, antistats, ironing aids, UV absorbers are described in WO 2007/115872 at page 28 line 14 to page 30 line 22 by way of example.

Production Process for Siloxanes of the Invention:

The process for producing the polysiloxanes of the invention rests on the use of the compounds mentioned hereinbelow by way of example, wherein a) terminally hydroxyl-functional linear or branched polysiloxanes and their mixtures with dimethyldialkoxysilanes or methyltrialkoxysilanes or tetraethoxysilane, preferably linear terminally dihydroxy-functional polysiloxanes, b) hexamethyldisilazane, or disilazanes which are substituted with different carbon radicals, for example divinyltetramethyldisilazane, preferably hexamethyldisilazane;

c) 3-aminopropylmethyldialkoxysilanes, N-(2-aminoethyl)-3-aminopropylmethyldialkoxysilanes or further functional dialkoxysilanes comprising linear or branched, saturated or unsaturated hydrocarbon radicals substituted with hydroxyl-substituted amides and/or hydroxyl-substituted carbamate structures and/or ethoxylated amines and/or guanidine or alkylenylguanidine structures, or selected from the group of substances of formulae 2a-i

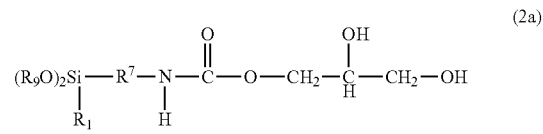

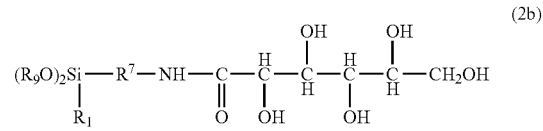

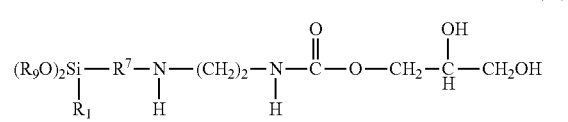

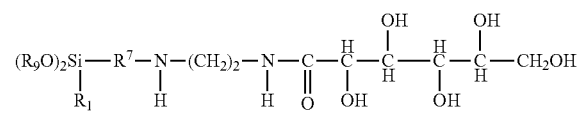

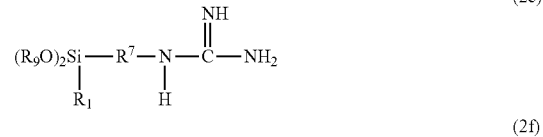

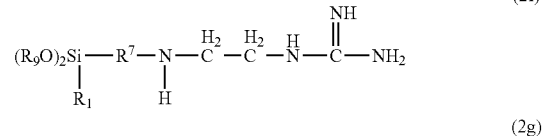

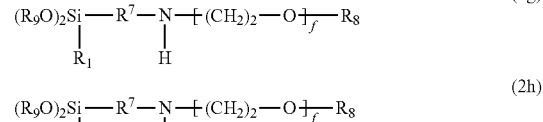

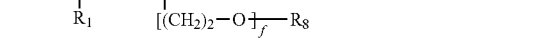

-continued

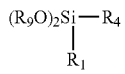
(2i)

where $R_1$ and $R_4$ are each as defined for formula 1, $R_8$ is $R_6$, preferably $R_8$ is a hydrogen atom, a methyl group or a carboxyl group, more preferably H or acetyl, and $R_9$ is an alkyl or acyl radical, more particularly methyl, ethyl or acetyl, are reacted with one another. The silanes are advantageously used as a monomer. When it is advantageous for later use, the silanes may be pre-condensed under hydrolytically acidic conditions to form oligomers before the polymer construction is initiated through addition of the dihydroxy-functional polysiloxanes.

It may be advantageous to use the silazane in a small excess over the stoichiometric amount. The dialkoxysilanes used are prepared using methods of synthesis which are known in the prior art. The guanidination of amino-functional silanes is carried out similarly to the guanidination of aminosiloxanes which is described in JP 2002 167437. The reaction of amino-functional siloxanes with glycerol carbonate or gluconolactone is carried out on the lines of EP 1 972 330 A1 and J. Phys. Chem. B 2010, Vol. 114, pp. 6872-6877.

Catalysts used for the hydrolysis and condensation reaction are carboxylic acids such as, for example, acetic acid, propionic acid, isononanoic acid or oleic acid. The reaction can be carried out in the presence of small amounts of added water to speed the hydrolysis, but frequently sufficient moisture will be present in the reagents used undried. The reaction can be carried out without a solvent or in the presence of solvents, for example aliphatic and aromatic, protic and aprotic solvents, glycols, ethers, fatty alcohol alkoxylates, mono-, di- and triglycerides or oils of synthetic or natural origin. Using solvents will be advantageous for example when the chain lengths of the desired structures bring about high viscosities. The solvent can be added before, during or after the reaction. The reaction can be carried out at temperatures in the range from room temperature to 150° C., preferably at 50-100° C. The alcohols released in the hydrolysis are vacuum distilled off during or after the reaction. Neutralization and filtration steps are optional.

The invention is further described by the following non-limiting examples which further illustrate the invention, and are not intended, nor should they be interpreted to, limit the scope of the invention.

EXEMPLARY EMBODIMENTS

The recording and interpretation of NMR spectra is known to a person skilled in the art. The book "NMR Spectra of Polymers and Polymer Additives" by A. Brandolini and D. Hills, published in the year 2000 by Marcel Dekker Inc., may hereby be introduced as a reference.

The molar ratios between the substituents of the polysiloxanes can be determined by NMR spectroscopy, more particularly by quantitative $^{13}C$ NMR methods, supplemented by selective nitrogen determination of primary as well as secondary as well as tertiary amine structures.

SYNTHESIS EXAMPLES

Example 1

Preparing a Gluconolactampropyldiethoxy-Methylsilane of Formula 2b 35.62 g of D(+)-glucono-δ-lactone (99% pure, Sigma Aldrich) in 35 g of 2-propanol is suspended at 70° C. and stirred for 1 hour in a 250 ml four-neck flask equipped with connected KPG stirrer, dropping funnel, reflux condenser and internal thermometer. 38.62 g of 3-amino-propylmethyldiethoxysilane (Dynasylan® 1505, Evonik Degussa GmbH) are added dropwise at 75° C. during 5 minutes. This is followed by a further 4 hours of stirring at 75° C. to obtain a clear, slightly yellowish product of 64.8% solids content. Solids content is determined by two-hour distillative removal of the solvent in a rotary evaporator at 60° C. and 20 mbar and subsequent weighing. The $^{13}C$ NMR spectrum shows complete reaction with the gluconolactone, since there are no signals at 45 ppm to indicate residual quantities of a $CH_2$—$NH_2$ group.

Example 2

Preparing an Ethanolic Solution Comprising 3-guanidinopropylmethyldiethoxysilane of Formula 2c and 3-aminopropylmethyldiethoxysilane A 500 ml four-neck flask equipped with connected KPG stirrer, dropping funnel, reflux condenser and internal thermometer is initially charged with 95.67 g of 3-aminopropyl-methyldiethoxysilane (Dynasylan® 1505, Evonk Degussa GmbH) and 70 g of ethanol. Under stirring, 27 g of acetic acid (99-100% pure, J. T. Baker) are added dropwise at room temperature during 15 minutes. This is followed by heating to 79° C. and, under stirring, 10.51 g of Cyanamid F 1000 (Alzchem Trostberg GmbH) dissolved in 30 g of ethanol are added dropwise over a period of 2 hours. This is followed by a further 4 hours of stirring at 79° C. to obtain a clear, colourless product of 54.9% solids content. The molar ratio of aminopropylsilane to guanidinopropyl-silane, as determined by $^{13}C$ NMR, is 3:2.

Example 3

Preparing a Gluconolactampropyl- and Aminopropyl-Functional Polysiloxane

A 500 ml four-neck flask equipped with connected KPG stirrer, dropping funnel, reflux condenser and internal thermometer is used to heat 200 g of dihydroxy-functional poly-dimethylsiloxane having a chain length of 47.2 dimethylsiloxane units, 6.52 g of 3-amino-propylmethyldiethoxysilane (Dynasylan® 1505, Evonik Degussa GmbH) and 6.48 g of the 64.8% 2-propanolic silane solution of Example 1 to 85° C. with stirring. 0.68 g of acetic acid (99-100% pure, J. T. Baker) are added and a vacuum is applied. The mixture is stirred at 85° C. and 20 mbar for one hour. The vacuum is broken, 1.28 g of hexamethyldisilazane (98.5% pure, ABCR GmbH) are added, and the mixture is stirred at 85° C. and room pressure for 1 hour. This is followed by distillation at 85° C. and 20 mbar for 1 hour. 53.57 g of Tegosoft® P (Evonik Goldschmidt GmbH) are added before distilling for a further 2 hours to obtain a clear, slightly yellowish product having a viscosity of 320 000 mPa*s at 25° C. The proportion of trimethylsilyl-endblocked chain ends, as determined via $^{29}Si$ NMR, is 65%, based on the sum total of all chain ends.

Example 4

Preparing a Guanidinopropyl- and Aminopropyl-Functional Polysiloxane

A 1000 ml four-neck flask equipped with connected KPG stirrer, dropping funnel, reflux condenser and internal thermometer is used to heat 656.3 g of dihydroxy-functional polydimethylsiloxane having a chain length of 47.6 dimethylsiloxane units, 10.62 g of 3-amino-propylmethyldiethoxysilane (Dynasylan® 1505, Evonik Degussa GmbH) and 26.95 g of the 54.9% ethanolic silane solution of Example 2 to 85° C. with stirring. The mixture is stirred at 85° C. and 20 mbar for one hour. The vacuum is broken, 4.18 g of hexamethyldisilazane (98.5% pure, ABCR GmbH) are added, and the mixture is stirred at 85° C. and room pressure for 1 hour. This is followed by distillation at 85° C. and 20 mbar for 3 hours to obtain a turbid, colourless product having a viscosity of 41 500 mPa*s at 25° C. The proportion of trimethylsilyl-endblocked chain ends, as determined via $^{29}$Si NMR, is 80%, based on the sum total of all chain ends. The potentiometric titration of the product having two nitrogen-containing groups which differ in basicity does show two end points.

Example 5

Preparing an Octadecyl-Modified Aminosiloxane

A 500 ml four-neck flask equipped with connected KPG stirrer, dropping funnel, reflux condenser and internal thermometer is used to heat 246.6 g of dihydroxy-functional polydimethylsiloxane having a chain length of 47.2 dimethylsiloxane units, 9.64 g of 3-amino-propylmethyldiethoxysilane (Dynasylan® 1505, Evonik Degussa GmbH), 2.01 g of octadecylmethyldimethoxysilane (Wacker AG) and 1.18 g of acetic acid (99-100% pure, J. T. Baker) to 85° C. with stirring. This is followed by distillation at 85° C. and 20 mbar for one hour. The vacuum is broken, 1.28 g of hexamethyldisilazane (98.5% pure, ABCR GmbH) are added and the mixture is stirred at 85° C. and room pressure for 1 hour. This is followed by distillation at 85° C. and 20 mbar for 3 hours to obtain a colourless, slightly turbid product having a viscosity of 1520 mPa*s at 25° C. The proportion of trimethylsilyl-endblocked chain ends, as determined via $^{29}$Si NMR, is 75% based on the sum total of all chain ends.

Use Examples Pertaining to Textile Conditioning

General Formulation:

5% to 50% by weight of the siloxanes according to the invention, or of solutions thereof, are added to a propeller-stirred glass beaker containing a mixture of 1.25% to 12.5% by weight of a lauryl alcohol ethoxylate having a degree of ethoxylation of 6-10, or a mixture having differing degrees of ethoxylation, 0.05% to 0.5% by weight of concentrated acetic acid and 37.0% to 93.7% by weight of water.

Formulation Example 1—Inventive

20% by weight of the product of Synthesis Example 1 are added to a propeller-stirred glass beaker containing a mixture of 8.0% by weight of a lauryl alcohol ethoxylate having a degree of ethoxylation of 6 and 2.0% by weight having a degree of ethoxylation of 10, 0.4% by weight of concentrated acetic acid and 69.6% by weight of water to obtain a white low-viscosity formulation.

The formulations given in Table 1 were prepared similarly to the general formulation. The comparative product Biosoft 09 from BT Biotex SDN BHD Malaysia is an amino-functional silicone fluid which can be used as a soft-handle agent for fibres and textiles.

TABLE 1

Formulations produced

| Formulation example | Product used | Inventive |
|---|---|---|
| 1 | Synthesis Example 4 | yes |
| 2 | Biosoft 09 | no |

Application Examples

To verify the handle and also the hydrophilicity of the products according to the invention, products consisting of native fibres were finished using the following process:

Padding Process:

To examine the softness conferred by each emulsion, knit cotton fabric (160 g/m$^2$) and terry cotton fabric (400 g/m$^2$) were padded with a liquor containing in each case 12.5 g/l of the corresponding emulsion, squeezed off to a wet pick-up of about 100% and dried at 100° C. for three minutes.

To examine the hydrophilicity, woven cotton fabric (200 g/m$^2$) was padded with a liquor containing in each case 150 g/l of the corresponding emulsion and squeezed off to a wet pick-up of about 100% and dried at 130° C. for three to five minutes.

Exhaust Process:

To examine the softness, knit cotton fabric (160 g/m$^2$) and terry cotton fabric (400 g/m$^2$) were immersed in a 0.025% by weight (based on active silicone ingredient) liquor having a liquor ratio of 12:1 for 20 min with gentle mixing, gently wrung out and dried at 100° C. in an oven. To examine the hydrophilicity, woven cotton fabric (200 g/m$^2$) was immersed in a 0.025% by weight (based on active silicone ingredient) liquor having a liquor ratio of 120:1 for 20 min with gentle mixing and dried at 100° C. in an oven.

Test Methods:

Handle Assessment:

Fabric handle was assessed by an experienced team who assessed the anonymized handle samples of the knit and terry fabrics finished with the emulsions, with the aid of a hand panel test. The handle samples of knit fabric additionally included an untreated sample not overtly labelled.

Washing Operation:

The washing operations were performed in a commercial washing machine, Miele Novotronic W 918, with coloureds wash without prewash at 40° C. using wfk standard laundry detergent IECA base and 3 kg of cotton ballast fabric. The fabric thus treated was finally dried at room temperature for 12 hours.

Hydrophilicity Testing:

Hydrophilicity testing was performed using an in-house test method for measuring the height of rise of water, in line with German standard specification DIN 53924. The finished woven cotton test fabric is cut into five strips each 25 cm in length and 1.5 cm in width, marked with a water-soluble pen and secured in a taut perpendicular position, but without tension, to a holder. The holder is subsequently placed for five minutes in a water bath such that 2 cm of the strips are in the water. After the holder has stood outside the water bath for 10 minutes, the height of rise is read off in cm and assessed against the blank value (height of rise of untreated cotton strip×cm=100%) and reported as a percentage of the blank value.

The test results concerning softness are reported in Tables 2, 3 and 4 and concerning hydrophilicity, in Table 5.

TABLE 2

Softness assessment of terry cotton after
application by pad-mangle

| Formulation used | Before wash | After 1st wash | After 3rd wash | After 5th wash |
|---|---|---|---|---|
| 1 | +++ | +++ | ++ | ++ |
| 2 | ++ | ++ | + | + |
| untreated | − | − | − | − |

+++ excellent,
++ very good,
+ good,
o satisfactory,
− poor

TABLE 3

Softness assessment on knit cotton or terry cotton
after application by pad-mangle compared with
commercially available hydrophilic aminosiloxane

| Formulation used | Knit cotton | Terry cotton |
|---|---|---|
| 1 (inventive) | +++ | +++ |
| 2 (not inventive) | ++ | ++ |
| untreated | − | − |

+++ excellent,
++ very good,
+ good,
o satisfactory,
− poor

TABLE 4

Softness assessment after application by
pad-mangle and exhaust process

| | Pad-mangle | | Exhaust process | |
|---|---|---|---|---|
| Formulation used | knit cotton | terry cotton | knit cotton | terry cotton |
| 1 (inventive) | +++ | +++ | +++ | +++ |
| 2 (not inventive) | ++ | ++ | ++ | ++ |
| untreated | − | − | − | − |

+++ excellent,
++ very good,
+ good,
o satisfactory,
− poor

TABLE 5

Rewettability on woven cotton in % of
height of rise of untreated cotton strip after
application with pad-mangle

| | |
|---|---|
| Formulation 1 (inventive) | 85 |
| Formulation 2 (inventive) | 75 |
| untreated | 100 |

Assessment Summary:

The result is a soft, very fluffy and silky handle for the fabrics finished with the products according to the invention (for example formulation 1, Tables 3 and 4). The fabric thus finished also exhibited high springability and improved crease removal properties. More particularly, the softening effect of formulation Example 1 is superior to formulation Example 2 following application by the exhaust process (Table 4). The fabric also exhibits superior water absorption, as is reflected by the higher rewettability value (Table 5). Superior durability is evidenced by the results in Table 2.

Use Examples Pertaining to Textile Reconditioning:

To determine the softening effect of the siloxanes according to the invention on textile fabrics, cotton cloths are treated therewith. To this end, emulsions are prepared with the siloxanes in accordance with the following prescription:

20 parts of a heated polysiloxane according to the invention at 40° C. to 80° C. are initially charged to a propeller-stirred glass beaker. Subsequently, 5 to 25 parts by weight of dipropylene glycol, 5 to 25 parts by weight of a fatty alcohol ethoxylate having a degree of ethoxylation of 6 are added in succession with stirring. Finally, the mixture is made up to 100 parts by weight with water and subsequently stirred until it has cooled down to room temperature, but for at least 15 min.

Pretreatment of Cotton Fabric:

Terry cotton fabrics of 80 cm by 50 cm with a basis weight of about 350 g/m$^2$ were washed twice with fully-built powder, rinsed twice, hydroextracted and line dried in a single layer in the air.

Treatment of Cotton Fabric:

An inventive-siloxane formulation as described above was diluted with cold tap water to form a rinse solution comprising 0.025% by weight of inventive siloxane.

The cotton cloths were dipped for 10 min into two litres of the rinse solution. Care must be taken here to ensure that the cloths become evenly wetted by the rinse solution. The cloths were subsequently hydroextracted and line dried at room temperature in single layers. The terry cotton cloths treated were cut into 10 equal pieces measuring 16 cm by 25 cm.

Softness was assessed by an experienced 9-strong team who assessed the anonymized handle samples, of the cotton fabrics finished with the emulsions, with the aid of a hand panel test. Each judge was given a separate cotton cloth to assess. The assessment scale ranged from 0 (harsh and unpleasant handle) to 5 (soft and pleasant handle) with the possibility of awarding whole-numbered intermediate values.

To assess the softness, the individual assessments were summed, meaning that a maximum softness score of 45 is possible with 9 judges.

The handle samples additionally always included an untreated sample (blank) not overtly labelled.

Comparative Example

A commercially available microemulsion of an amino-functionalized siloxane, for example TEGOSIVIN® IE 11/59 having a solids content of 20% by weight, representing the prior art.

TABLE 6

Summary of softness results

| Example | Cotton fabric treated with siloxane of synthesis example | Softness |
|---|---|---|
| 6 | 3 | 25 |
| 7 | 4 | 42 |
| 8 | 5 | 30 |
| 9 | comparative example | 20 |
| 10 | without siloxane ("blank") | 0 |

It can clearly be seen from the data in Table 1 that the inventive modified siloxanes achieve an improved to greatly improved softness compared with a prior art siloxane.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:
1. Polysiloxanes of formula 1:

$$M_a D_b D^A_c D^B_d D^C_e T_f Q_g \quad \text{(formula 1)}$$

where:
M=[R²R¹₂SiO₁/₂]
D=[R¹₂SiO₂/₂]
$D^A$=[R¹Si(R⁷NHR³)O₂/₂]
$D^B$=[R¹SiR⁴O₂/₂]
$D^C$=[R¹SiR⁵O₂/₂]
T=[R¹SiO₃/₂]
Q=[SiO₄/₂]
in which:
R¹ in each occurrence independently represents identical or different linear or branched, saturated or unsaturated hydrocarbon radicals having 1 to 30 carbon atoms or else aromatic hydrocarbon radicals having 6 to 30 carbon atoms;
R² in each occurrence independently represents R¹, an alkoxy radical or a hydroxyl group;
R³ in each occurrence independently represents hydrogen or a hydrocarbon radical substituted with nitrogen atoms;
R⁴ in each occurrence independently represents identical or different linear or branched, saturated or olefinically unsaturated hydrocarbon radicals having 8 to 30 carbon atoms;
R⁵ in each occurrence is independently selected from the group consisting of:
identical or different linear or branched, saturated or unsaturated polar hydroxyl-substituted amide radicals having 1 to 30 carbon atoms;
hydroxyl-substituted carbamate radicals having 1 to 30 carbon atoms;
ethoxylated amine radicals having 1 to 30 carbon atoms; and
guanidine radicals or alkylenylguanidine radicals having 1 to 30 carbon atoms;
R⁷ in each occurrence independently represents identical or different linear or branched, saturated or unsaturated, divalent hydrocarbon groups having 1 to 20 carbon atoms;
a is 2 to 20;
b is 10 to 5000;
c is 1 to 500;
d is 0 to 500;
e is >0 to 500;
f is 0 to 20;
g is 0 to 20; and
c is >0.5*e;
or their ionic adducts with protic reactants H⁺A⁻;
with the proviso that:
at least 50% of the R² radicals are =R¹; and
at least one occurrence of R⁵ is a guanidine radical or an alkylenylguanidine radical having 1 to 30 carbon atoms.
2. The polysiloxanes according to claim 1; wherein R⁵ is a substituent selected from the group of substituents of formulae 1a to 1h:

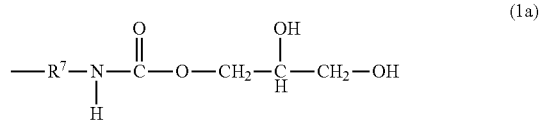
(1a)

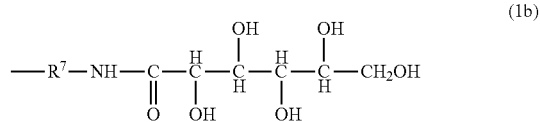
(1b)

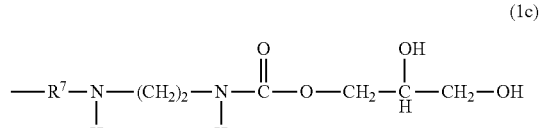
(1c)

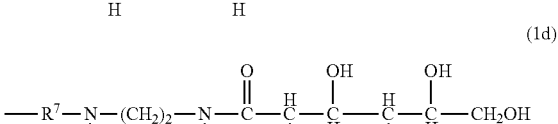
(1d)

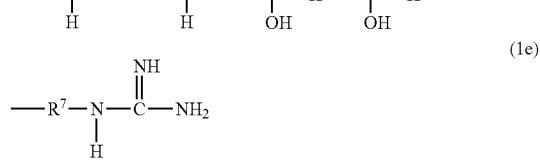
(1e)

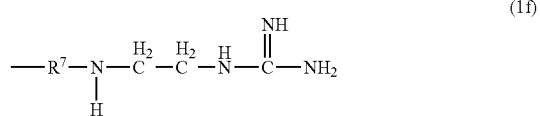
(1f)

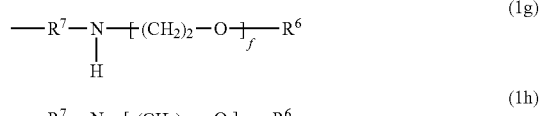
(1g)

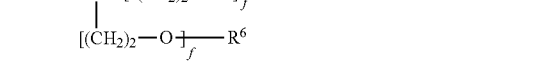
(1h)

where R⁶ is hydrogen, a hydrocarbon radical, an acyl radical, a carboxylate radical, or a carbamate or carbonate radical.
3. The polysiloxanes according to claim 1;
wherein anions A⁻ are identical or different counter-ions to the positive charges on the protonated nitrogen-containing groups, selected from organic or inorganic anions of the acids H⁺A⁻ and also derivatives thereof.
4. The polysiloxanes according to claim 2;
wherein anions A⁻ are identical or different counter-ions to the positive charges on the protonated nitrogen-containing groups, selected from organic or inorganic anions of the acids H⁺A⁻ and also derivatives thereof.
5. A composition comprising:
polysiloxanes according to claim 1.
6. A composition comprising:
polysiloxanes according to claim 5; and
further formulation and processing auxiliaries.
7. A method of cleaning or reconditioning textiles and fabrics comprising:
applying an effective amount of the composition of claim 5.
8. A process for preparing siloxanes according to claim 1, comprising:
reacting different functional silanes in a condensation process with terminally hydroxyl-functional polydimethylsiloxanes to form multifunctional endblocked polysiloxanes;

wherein:
aminoalkyldialkoxysilanes are functionalized at the amino group in a first step; and
unfunctionalized aminoalkyldialkoxysilanes and the functionalized aminoalkyldialkoxysilanes are cocondensed in a second step with hydroxyl-functional polydimethylsiloxanes in the presence of reagents releasing trimethylsilyl groups.

9. The process according to claim 8;
characterized in that trimethylsilyl groups endblock the silicone chain selectively without silating the amino groups or hydroxyl groups of the lateral organic modifications.

10. The process according to claim 8 wherein:
a) terminally hydroxyl-functional linear or branched polysiloxanes and their mixtures with dimethyldialkoxysilanes or methyltrialkoxysilanes or tetraethoxysilane;
b) hexamethyldisilazane;
c) 3-aminopropylmethyldialkoxysilanes, N-(2-aminoethyl)-3-aminopropylmethyldialkoxysilanes; and
d) further functional dialkoxysilane comprising linear or branched, saturated or unsaturated hydrocarbon radicals, where the dialkoxysilanes utilized are:
(i) substituted with:
hydroxyl-substituted amides; and/or hydroxyl-substituted carbamate structures; and/or ethoxylated amines; and/or guanidine or alkylenylguanidine structures; or
(ii) selected from the group of substances of formulae 2a-2i

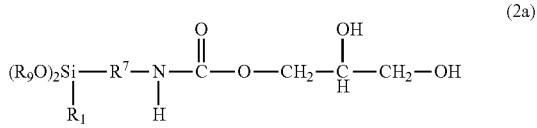
(2a)

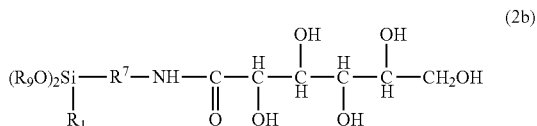
(2b)

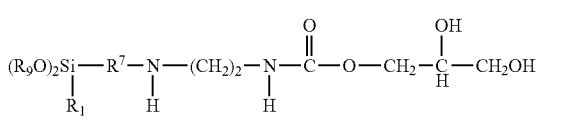
(2c)

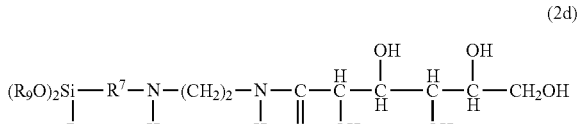
(2d)

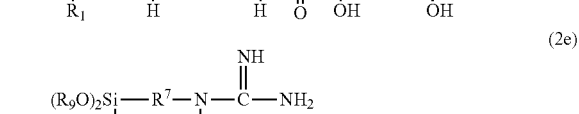
(2e)

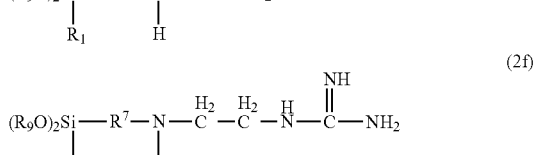
(2f)

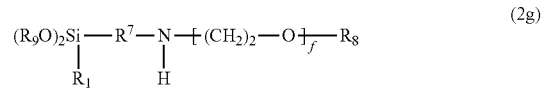
(2g)

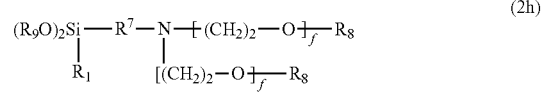
(2h)

(2i)

where $R_1$ and $R_4$ are each as defined for formula 1, $R_8$ is a hydrogen atom, a methyl group or a carboxyl group and $R_9$ is an alkyl or acyl radical;
with the proviso that at least one dialkoxysilane utilized is substituted with a guanidine or alkylenylguanidine structure;
are reacted with one another.

11. The process according to claim 9 wherein:
a) terminally hydroxyl-functional linear or branched polysiloxanes and their mixtures with dimethyldialkoxysilanes or methyltrialkoxysilanes or tetraethoxysilane;
b) hexamethyldisilazane;
c) 3-aminopropylmethyldialkoxysilanes, N-(2-aminoethyl)-3-aminopropylmethyldialkoxysilanes; and
d) further functional dialkoxysilanes comprising linear or branched, saturated or unsaturated hydrocarbon radicals, where the dialkoxysilanes utilized are:
(i) substituted with:
hydroxyl-substituted amides; and/or
hydroxyl-substituted carbamate structures; and/or
ethoxylated amines; and/or
guanidine or alkylenylguanidine structures; or
(ii) selected from the group of substances of formulae 2a-2i:

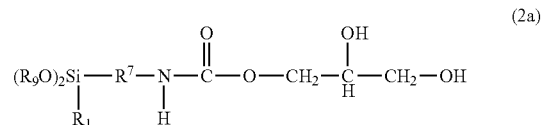
(2a)

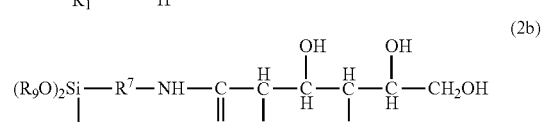
(2b)

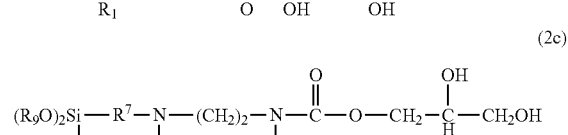
(2c)

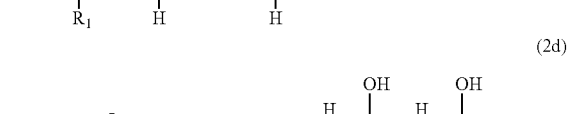
(2d)

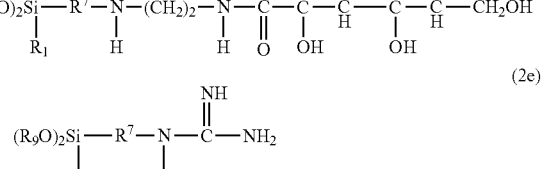
(2e)

-continued
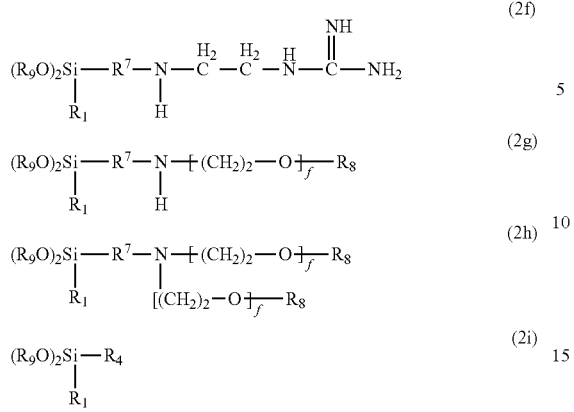
where $R_1$ and $R_4$ are each as defined for formula 1, $R_8$ is a hydrogen atom, a methyl group or a carboxyl group and $R_9$ is an alkyl or acyl radical;
with the proviso that at least one dialkoxysilane utilized is substituted with a guanidine or alkylenylguanidine structure;
are reacted with one another.
* * * * *